United States Patent [19]

Chen et al.

[11] Patent Number: 5,544,282

[45] Date of Patent: Aug. 6, 1996

[54] METHOD AND APPARATUS FOR PLANNING MOTIONS OF ROBOT MANIPULATORS

[76] Inventors: Pang C. Chen, 4000 Camino De La Sierra, N.E., Albuquerque, N.M. 87111; Yong K. Hwang, 9036 Walter Bambrook, N.E., Albuquerque, N.M. 87122

[21] Appl. No.: 682,155

[22] Filed: Apr. 5, 1991

[51] Int. Cl.$^6$ .................................................. G06F 15/20
[52] U.S. Cl. .............................. 395/90; 395/94; 364/461
[58] Field of Search .............................. 395/90, 22, 904, 395/94; 364/461

[56] References Cited

U.S. PATENT DOCUMENTS

| | | | |
|---|---|---|---|
| 4,578,757 | 3/1986 | Stark | 395/90 |
| 4,636,699 | 1/1987 | Kato | 395/90 |
| 4,862,373 | 8/1989 | Meng | 395/90 |
| 5,047,916 | 9/1991 | Kondo | 395/90 |
| 5,150,026 | 9/1992 | Seraji et al. | 395/90 |
| 5,172,253 | 12/1992 | Lynne | 395/23 |
| 5,220,497 | 6/1993 | Trovato et al. | 395/90 |

OTHER PUBLICATIONS

*The Design and Analysis of Computer Algorithms* Addison–Wesley, New York (1974) pp. 207–209.
*Rapid Computation of Configuration Space Obstacles* Michael S. Branicky, et al IEEE 1990 pp. 304–310.
*Path Planning Using a Jacobian–Based Freespace Generation Algorithm* Brad Paden et al IEEE 1989 pp. 1732–1737.
*A Simple Motion–Planning Algorithm for General Robot Manipulators* Tomas Lozano–Perez IEEE 1987 pp. 224–238.
*A Monte–Carlo Algorithm for Path Planning with Many Degrees of Freedom* Jerome Barraquand, et al IEEE 1990 pp. 1712–1717.
*A Local Based Approach for Path Planning of Manipulators with a High Number of Decres of Freedom* by Bernard Faverjon et al IEEE 1987 pp. 1152–1159.
Chapter 12 "Graphs" from *Applied Algebra for the Computer Sciences* Arthur Gill, Prentice–Hall Inc. 1976 pp. 360–364.
Subchapter 1.2 "Sets" from *Elements of the Theory of Computation* by Harry R. Lewis, Prentice–Hall, Inc. 1981 pp. 5–6.
*A Fast Procedure for Computing the Distance Between Complex Objects in Three–Dimensional Space,* Elmer G. Gilbert, et al IEEE 1988 pp. 193–203.

*Primary Examiner*—George B. Davis
*Attorney, Agent, or Firm*—Peacock & Myers

[57] ABSTRACT

Method and apparatus for automatically planning motions of robot manipulators. The invention rapidly finds a collision-free path in a cluttered robot environment, if one exists, from any starting configuration of the robot manipulator to any ending configuration. The time to solution of a motion planning problem is not uniform, but proportional to the complexity of the problem.

45 Claims, 6 Drawing Sheets

METHOD AND APPARATUS FOR PLANNING MOTIONS OF ROBOT MANIPULATORS

BACKGROUND OF THE INVENTION

1. Field of the Invention (Technical Field)

The present invention relates to a method and apparatus for automatically planning movements of robot manipulators through a cluttered environment, the invention finding a collision-free path, if one exists, from any starting configuration of the manipulator to any desired ending configuration.

2. Background Art

Robotic systems require motion planning components so that manipulators may execute tasks without colliding with objects in their workspace. Motion planning components must find a short and collision-free path from any starting point to any goal position of a manipulator. In the prior art, manipulators are either controlled directly by human operators or restricted to trajectories that have been pre-computed through hours or days of off-line computation and programming.

Human operators have significant drawbacks. They require a long training period before becoming comfortable with and proficient at the use of robot manipulators. While human operators can react creatively to changing circumstances, they become fatigued and otherwise prone to error and reduced efficiency. Most importantly, when robotic operations are performed in hazardous environments, such as in hard vacuum, under high water pressure, and in high radiation zones, use of human workers becomes extremely expensive if not impossible. Safety and tele-operations equipment are costly and reduce the efficiency of operations.

Robot manipulator trajectories may be generated through off-line programming from descriptions of the robotic tasks and the workspace environment. However, such trajectories are prone to becoming invalid due to unexpected changes of position of objects in the environment or the introduction of new objects into the environment. The trajectories cannot be modified without halting operations. Hence, off-line programming is only feasible in a highly structured and well-controlled environment such as a manufacturing plant.

No practical real-time motion planners exist in the prior art. The prior art planners may be broadly placed into two categories: complete and heuristic. Complete motion planners either find a collision-free path if one exists or show that not one exists. These planners require long computation times, on the order of tens of hours. Heuristic motion planners are relatively fast for many problems (under ten minutes), but may fail to find existing collision-free paths.

At least three complete motion planners exist in the prior art, all requiring long computation times, on the order of several hours for five and six-degree-of-freedom (DOF) robot manipulators. M. S. Branicky and W. S. Newman, "Rapid Computation of Configuration Obstacles," 1990 *Proceedings of IEEE International Conference on Robotics and Automation*, pp. 304–10; B. Paden, et al., "Path Planning Using a Jacobjan-Based Freespace Generation Algorithm," 1989 *Proceedings of IEEE International Conference on Robotics and Automation*, pp. 1732–37; and T. Lozano-Pérez, "A Simple Motion-Planning Algorithm for General Robot Manipulators," *IEEE Journal of Robotics and Automation*, Vol. RA-3, No. 3, pp. 224–38, June 1987. The Lozano-Pérez motion planner is commercially available as a part of the robot simulation package Cimstation, available from Silma, Inc. Fast computation times are vital for five and six DOF robots because those are the most common types of robot manipulators in day-to-day use. A six DOF robot manipulator is required to position (x, y, z) and orient (roll, pitch, yaw) an object anywhere within the robot's workspace.

Heuristic motion planners existing in the prior art include J. Barraquand and J. Latombe, "A Monte-Carlo Algorithm for Path Planning With Many Degrees of Freedom," 1990 *Proceedings of IEEE International Conference on Robotics and Automation*, pp. 1712–17, and B. Faverjon and P. Tournassoud, "A Local Approach for Path Planning of Manipulators with a High Number of Degrees of Freedom," 1987 *Proceedings of IEEE International Conference on Robotics and Automation*, pp. 1152–59. While these heuristic motion planners have average computation times under ten minutes for five and six DOF problems, all are incomplete in that they can fail to find a collision-free motion for some problems for which one exists.

Real-time automation of motion planning that also finds a collision-free path if one exists offers a number of advantages over the prior art. It relieves human workers of the continual burden of detailed motion design and collision avoidance, and allows them to concentrate on the robotic tasks at a supervisory level. Robots with an automatic motion planner can accomplish tasks with fewer, higher-level commands. Robotic tele-operations can become much more efficient because commands can be given at coarser time intervals. With an automatic motion planner and appropriate environment sensing systems, robots can adapt quickly to unexpected changes in the environment and be tolerant to modeling errors of the workspace.

An effective motion planning method and device, in order to be used in real-life production and research tasks, must be able to plan a collision-free motion for a six DOF robot manipulator within a few minutes on today's computer workstations. It must also be robust in that it succeeds in finding a motion in most realistic environments. With the rapidly increasing speed and decreasing cost of computer workstations, the method and device of the present invention will plan motions in seconds rather than minutes.

SUMMARY OF THE INVENTION

(DISCLOSURE OF THE INVENTION)

This invention relates to a method and apparatus for planning motions of a robot manipulator through a workspace containing obstacles given a preselected starting configuration of the manipulator and a preselected goal robot manipulator configuration. The invention selects partially specified configurations as subgoals, generates a sequence of the subgoals that connect the starting configuration to the goal configuration, and verifies that the generated sequence of subgoals is collision-free.

In the preferred embodiment, the invention selects partially specified configurations as subgoals by selecting from a set of subgoals within a subspace of an existing subgoal, each member of the set having a refinement level one greater than the existing subgoal. The selected refined subgoals are those having the greatest distances from objects in the workspace and also being greater than a specified edge cost away from other selected subgoals.

The invention, in the preferred embodiment, generates a sequence of subgoals connecting the starting configuration to the goal configuration by applying a shortest path method to those subgoals having no verified collision-free sequence of configurations from either the starting or ending configurations. The shortest path method defines the potential first points of the shortest path as a set of all configurations having a verified collision-free path of configurations from the starting configuration and the potential end points of the shortest path as a set of all configurations having a verified collision-free sequence of configurations from the goal configuration, or vice versa. The invention defines the edge cost between two subgoal configurations as the sum of the differences between the commonly specified components of the configuration space nodes representing the two subgoal configurations.

The invention verifies that the generated sequence of subgoals is collision-free by searching, bi-directionally, for a collision-free sequence of configurations for each pair of subgoals adjacent in the generated sequence. The direction of search is determined by which of two configurations, having a verified collision-free sequence of configurations from the starting configuration and the goal configuration, respectively, has the smaller Euclidean distance from the corresponding nearest obstacle in the workspace. The invention searches for a collision-free path by sampling a preselected number of configurations that are within a single step of a configuration having a verified collision-free sequence of configurations from either the starting or ending configuration or the goal robot manipulator configuration, and selecting that configuration of the sampling having the greatest Euclidean distance from the corresponding nearest obstacle in the workspace.

The invention in its preferred embodiment employs a dynamic graph data structure. The vertices of the graph are those subgoal configurations having a verified collision-free sequence of configurations from either the starting or ending configuration, those subgoals having no such verified collision-free sequence, and those completely specified configurations having such a verified collision-free sequence. The edges of the graph are (a) between subgoal configurations having a verified collision-free sequence of configurations from either the starting or goal configuration and subgoal configurations having no such verified collision-free sequence and (b) between subgoal configurations having no such verified collision-free sequence and fully specified configurations having such a verified collision-free sequence.

The preferred embodiment maps all possible robot manipulator configurations into a configuration space having a number of dimensions equal to the number of degrees of freedom of the robot manipulator. The extent of each dimension is dependent on a preselected stride value for the corresponding joint of the robot manipulator. The stride values are normalized such that each point on the robot manipulator moves approximately the same Euclidean distance for each step in the dimension, where a step is a motion by the joint of less than or equal to the normalized stride value for the joint.

The apparatus of the invention preferably comprises one or more robot manipulators, a computer, sensors that determine the locations of objects within the workspace of the robot manipulator(s), and a display device.

A primary object of the invention is to plan motions for robot manipulators through a cluttered workspace both quickly and systematically, so that the need for human intervention or off-line programming in planning motions is eliminated.

An additional object of the invention is to permit motions to be rapidly replanned when changes in the workspace occur.

A primary advantage of the invention is that motions for five and six degree-of-freedom robot manipulators are planned in minutes or less rather than hours or less.

Another advantage of the invention is that, within tolerances specified to the invention, a collision-free path will be found if one exists.

An additional advantage of the invention is that uncomplex motion planning problems are solved rapidly, while complex motion planning problems are solved in gradually increasing time, according to the level of complexity.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

Figure 1:
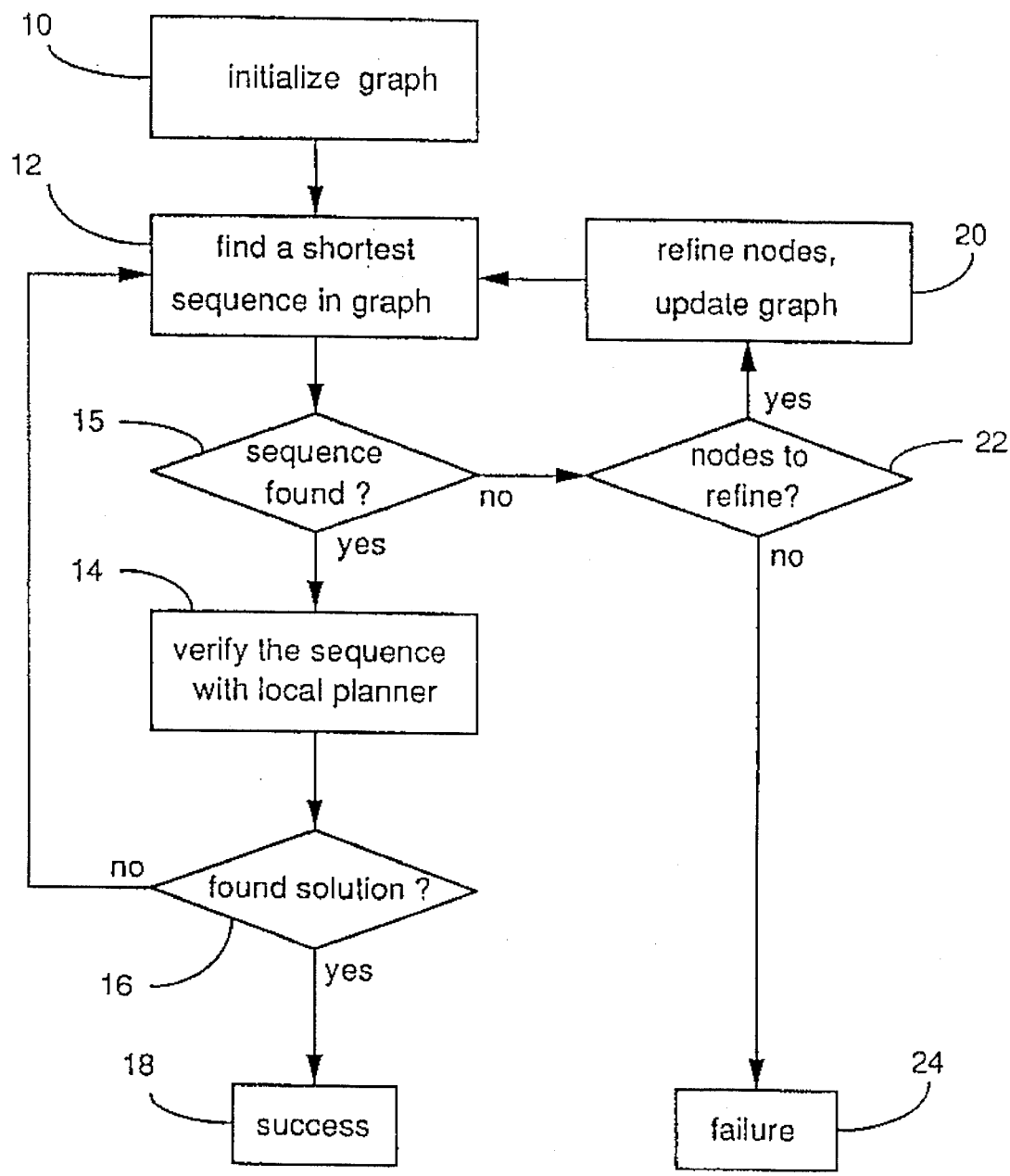
FIG. 1 is a flowchart illustrating the preferred method of the invention.

DESCRIPTION OF THE PREFERRED EMBODIMENTS (BEST MODES FOR CARRYING OUT THE INVENTION)

The method and apparatus of the present invention comprise a method, software and associated hardware permitting automated planning of collision-free motions by robot manipulators in a cluttered environment. Using present-day computer workstations, the invention will find a collision-free path between two configurations of a six degree-of-freedom (DOF) manipulator within a few minutes. The invention assumes no special structure or DOF limitation to the manipulator it plans for. Given certain input parameters specifying tolerances, the invention will find a collision-free path if one exists. The invention thus provides the merits of the speed of prior art heuristic motion planners and the robustness of prior art complete motion planners.

Throughout the specification and claims, the following terms are defined as follows: "Graph," "vertex," "edge," and "connect" have the meanings set forth in Chapter 12 of A. Gill, *Applied Algebra for the Computer Sciences* (Prentice Hall, Inc.; Englewood Cliffs, N.J.; 1976). "Set" and "subset" have the meanings set forth in Chapter 1.2 of H. Lewis & C. Papadimitriou, *Elements of the Theory of Computation* (Prentice Hall, Inc.; Englewood Cliffs, N.J.; 1981). "Robot manipulator" or "manipulator" means a device movable in one or more dimensions of space. "Robot" means a robot manipulator and corresponding motion control means. "Joint" means a location on a robot manipulator creating a DOF (generally, each joint will have a motor that controls motion of the manipulator through that joint). "Link" means a portion of a manipulator located between two joints or between a joint and a non-joint end of the manipulator. "Stride" means a preset or predetermined amount of attitudinal change in a given joint. "Step" means the configuration change corresponding to the attitudinal change of each joint less than or equal to the stride for the joint. "Configuration space" means a $\Delta$-dimensional space, $\Delta$ being the number of degrees of freedom (and the number of joints) of a corresponding robot manipulator, wherein the number of permissible values in each dimension (the extent of the dimension) equals the number of possible attitudinal positions for the corresponding joint, each attitudinal position being a stride apart from its adjacent positions. "Point" means a $\Delta$-vector in configuration space with all $\Delta$ components specified. "Configuration" means the attitude of a robot manipulator uniquely identified by a point in configuration space. "Node" means a $\Delta$-vector in configuration space having fewer than all components specified. The "refinement level" of a node is the number of components specified for the node. "Neighbor" means a node or point within a single step of a reference node or point.

In the preferred embodiment, discussed herein, the method and apparatus of the present invention plans a motion of a robot manipulator in its corresponding configuration space. To achieve both time efficiency and completeness, the invention searches the configuration space both heuristically and systematically so that each motion planning problem is solved in a time proportional to the problem's difficulty.

Given two points s and t representing the start and goal configurations of a robot manipulator, the invention maintains a set of subgoals as guidelines in moving to the goal configuration. Subgoals represent portions of the configuration space that are easy for the manipulator to reach in that they correspond to positions of the manipulator having relatively large clearances to objects in the robot's environment, as well as having relatively large clearances between links of the manipulator. Each point q in configuration space maps to a Euclidean distance d(q) of the manipulator to the nearest obstacle in the three-dimensional environment of the robot, as disclosed in E. Gilbert, et al., "A Fast Procedure for Computing the Distance Between Complex Objects in Three-Dimensional Space," *IEEE Journal of Robotics and Automation*, Vol. 4, No. 2, pp. 193–203 (April 1988). In the early stages of planning, the invention maintains only a small number of broad subgoals, each of which represents a subspace containing a substantial portion of the configuration space. Because these subgoals are broad (not all components are specified), they provide only coarse guidelines in planning the manipulator's motion. A collision-free motion is found quickly with only these broad guidelines if the problem is relatively easy. However, if the planner cannot find a collision-free path with these broad subgoals, then some of the broad subgoals are broken down into several smaller, heuristically selected subgoals to provide more specific guidelines. The invention achieves speed by delaying the process of subgoal refinement as long as possible and then performing it in a non-uniform fashion.

Reference is now made to the drawings which illustrate the preferred embodiment of the invention. At the highest level of abstraction, the invention uses a generate-and-test strategy to plan motions, as illustrated by FIG. 1. A global planning component, illustrated by FIGS. 2 to 4, generates a plausible sequence of subgoals to guide the robot manipulator 12, then a local planning component 14, illustrated by FIG. 5, tests the reachability of each subgoal in the sequence. If the local planner succeeds in reaching the goal through the tested sequence 16, then a collision-free path has been found 18. If the local planner fails to reach a subgoal due to collisions, then the global planner attempts to find another sequence without subgoal refinement 15, and again invokes the local planner to test the sequence. If no untested plausible sequence is available, then the global planner refines the subgoals 20 and again begins the generate and test strategy. If no subgoals are available for refinement 22, no collision-free path exists 24 within the tolerance parameters specified.

The invention employs certain data structures to generate a collision-free path between points s and t for a robot manipulator with $\Delta$ degrees of freedom. The primary structure is a dynamic graph G whose vertices are $\Delta$-vectors and which contains s, t, and a changing set of nodes representing subgoals. The vertices of G are divided into three sets: U, which contains all nodes found to be reachable from either s or t; V, which contains nodes not yet found reachable; and P, which contains the points reached when a node is declared reachable by the local planner of the invention. Set P is further subdivided into $P_s$ and $P_t$ representing points found reachable from s and t, respectively. The edges of G establish three classes of connections: those between $P_s$ and V, those between $P_t$ and V, and those within U u V. The edge cost between two nodes is defined as the sum of the differences between the commonly specified components of the two nodes if that does not exceed a certain threshold $T_e$, and infinity otherwise. The data structure also maintains for each point in P the corresponding cost to reach that point from either s or t. The refinement of subgoals in the preferred embodiment is controlled by a list structure Q containing none or more subgoal nodes. Three dynamic functions, A, B, and C, map points to nodes, nodes to points, and nodes to sets of nodes, respectively.

Referring to FIG. 1, when a motion planning task is provided to the preferred embodiment, it first initializes the above data structures 10 as follows. $P_s$ is set to (s), $P_t$ to {t}, U to {} (the empty set), and V to {$v_0$} (a set containing a totally unspecified node, i.e., that at refinement level zero). The initialization connects s to $v_0$ and $v_0$ to t. Q is initialized to an empty list, and A, B, and C to null functions.

In the preferred embodiment, global planning takes place in three stages: sequence generation, sequence verification, and node refinement. In the sequence generation stage, illustrated in FIG. 2, the global planner generates a plausible sequence of subgoals by applying Dijkstra's shortest-path method, A. Aho, et al., *The Design and Analysis of Computer Algorithms* (Addison-Wesley; New York; 1974), pp. 207–09, on G / U (G excluding U) with source points $P_s$ and sink points $P_t$. The cost of any sequence of nodes is the sum of the edge costs between the nodes plus the costs of the two end points. The preferred embodiment adopts the principle that once a subgoal is declared reachable, no other way of reaching it will be considered by the global planner. This principle is implemented by associating at most one point in P with each node in U via function A.

Figure 2:
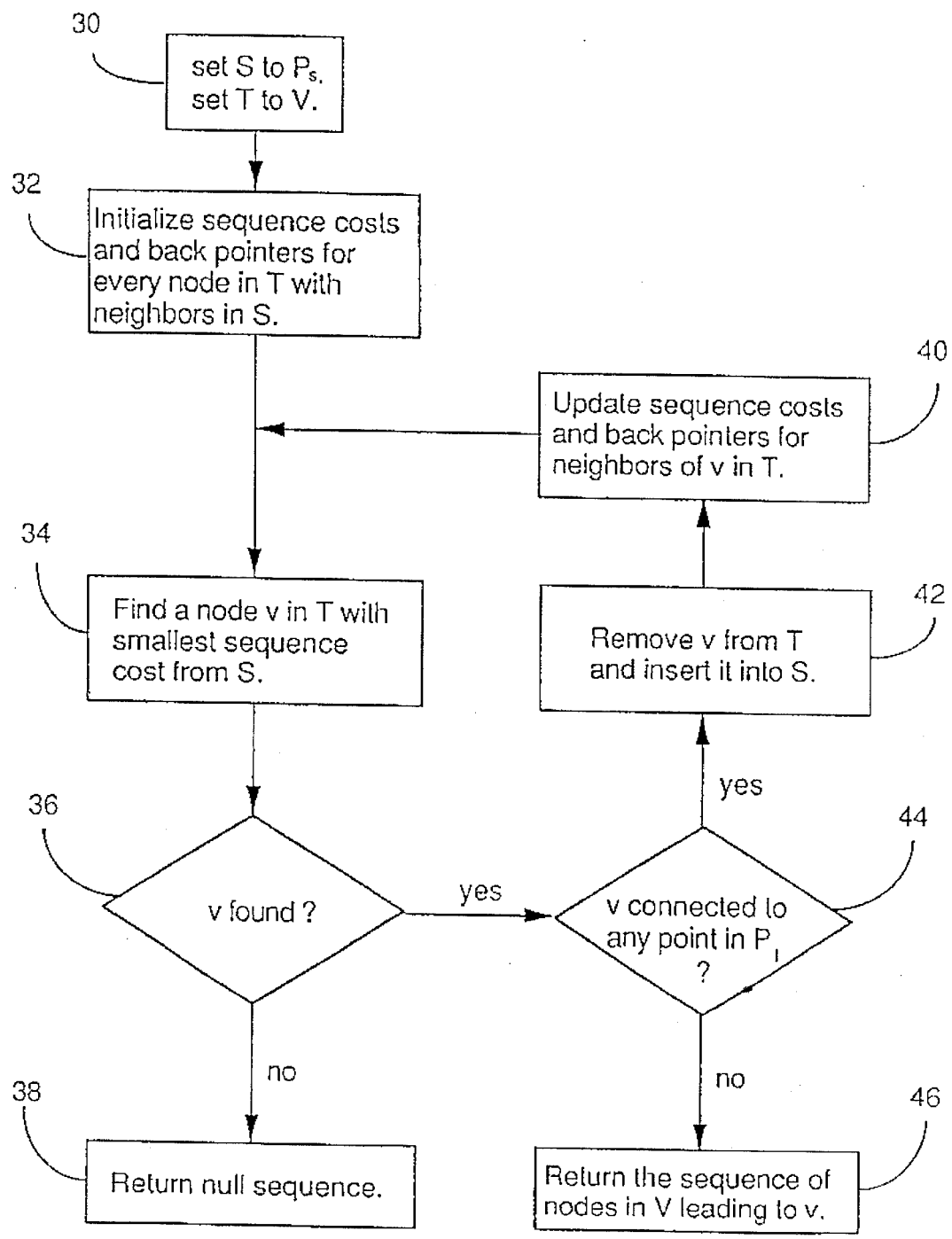
FIG. 2 is a flowchart illustrating the preferred sequence generation stage of the method of the invention.
Figure 3:
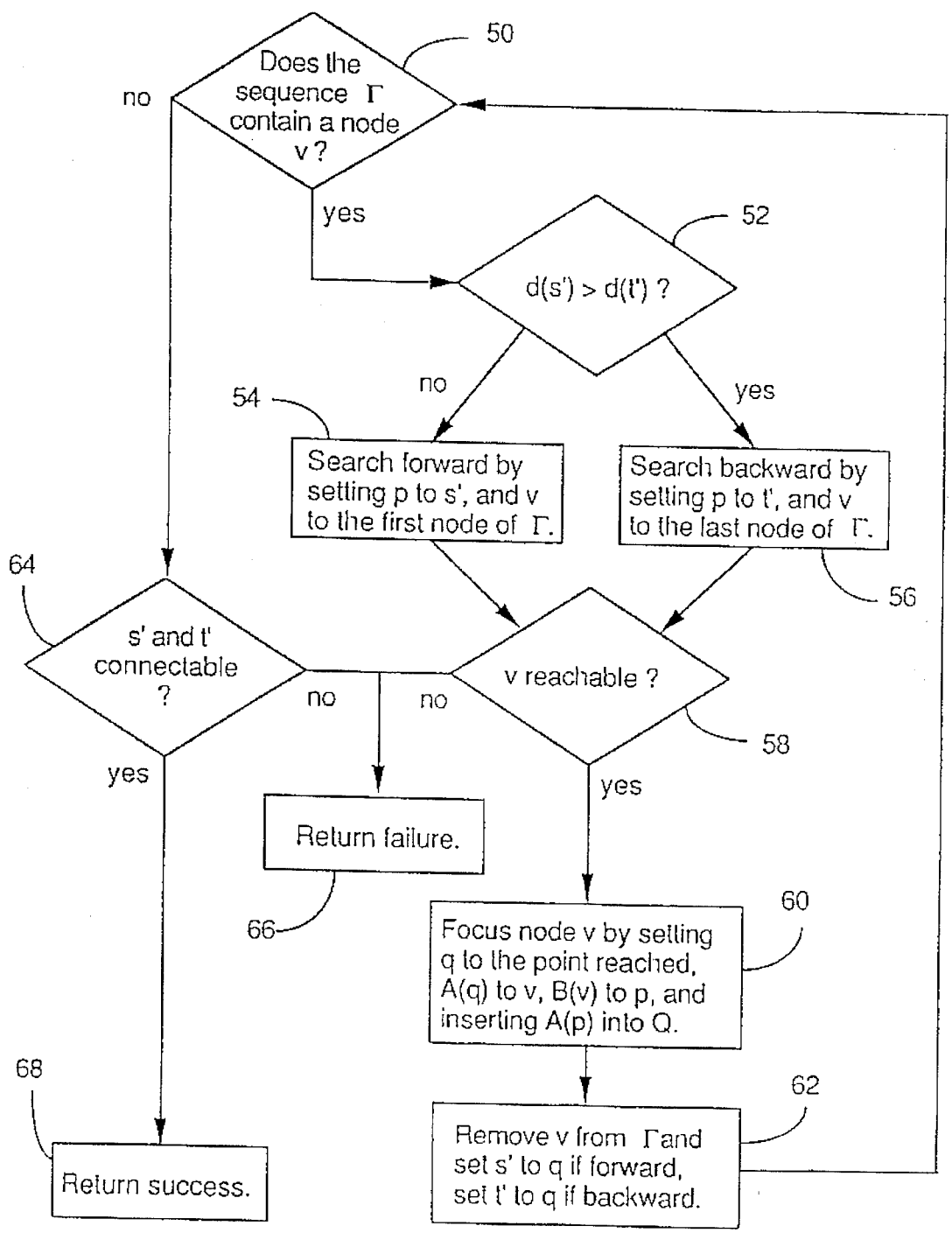
FIG. 3 is a flowchart illustrating the preferred sequence verification stage of the method of the invention.

Referring to FIG. 2, the sequence generation stage first sets S to $P_s$ and T to V 30. For each node in T having a neighbor in S, back pointers are set within B and sequence costs are calculated 32. The node v within T having the smallest sequence cost from S is determined 34. If such a v exists 36, and v is connected to any point in $P_t$ 44, then v is swapped from T to S 42, sequence costs and back pointers are updated for neighbors of v in T 40, and a new node v is determined. If v is not connected to any point in $P_t$ 44, then the appropriate sequence of nodes in V leading to v is passed 46 to the sequence verification stage. If no v exists 36, then subgoal nodes must be refined 38.

If Dijkstra's algorithm produces a sequence with a bounded cost 46, then the sequence verification stage is entered. This stage, illustrated in FIG. 3, determines the connectibility of the sequence by searching bi-directionally using the local planner. Let s' ∈ $P_s$ and t' ∈ $P_t$ be the end points of the sequence. The sequence verification stage chooses the search direction by comparing d(s') with d(t') 52. If the former is greater, then the stage searches backward by starting at t' 56, otherwise the stage searches forward by starting at s' 54. Let p be the starting end point and p' be the other end point. To search forward, the local planner is invoked to check the reachability of the first node v of the sequence from point p; to search backward, the local planner is invoked to check the reachability of the last node v from point p. In either case, if v is reachable 58, the local planner will return to the verification stage of the global planner a point q, whose coordinates in configuration space coincide with those coordinates of v which are specified. The verification stage then swaps v from V to U, inserts q into P and A(p) into Q, sets A(q) equal to v, connects q to all nodes presently in V, and sets B(v) equal to p (which permits a path from s or t to q to be retraced) 60. The verification stage is then continued iteratively by checking the connectibility of p' and q 62.

The verification stage ends 64 either when the sequence of subgoal nodes is connected 68, or a node v is found unreachable from a point p 66. In the former instance, the motion planner can retrace a path from s to t using the existing state of G, A, and B to yield a collision-free motion for the robot manipulator. In the latter instance, p is disconnected from v and the sequence-generation stage is reentered.

Figure 4:
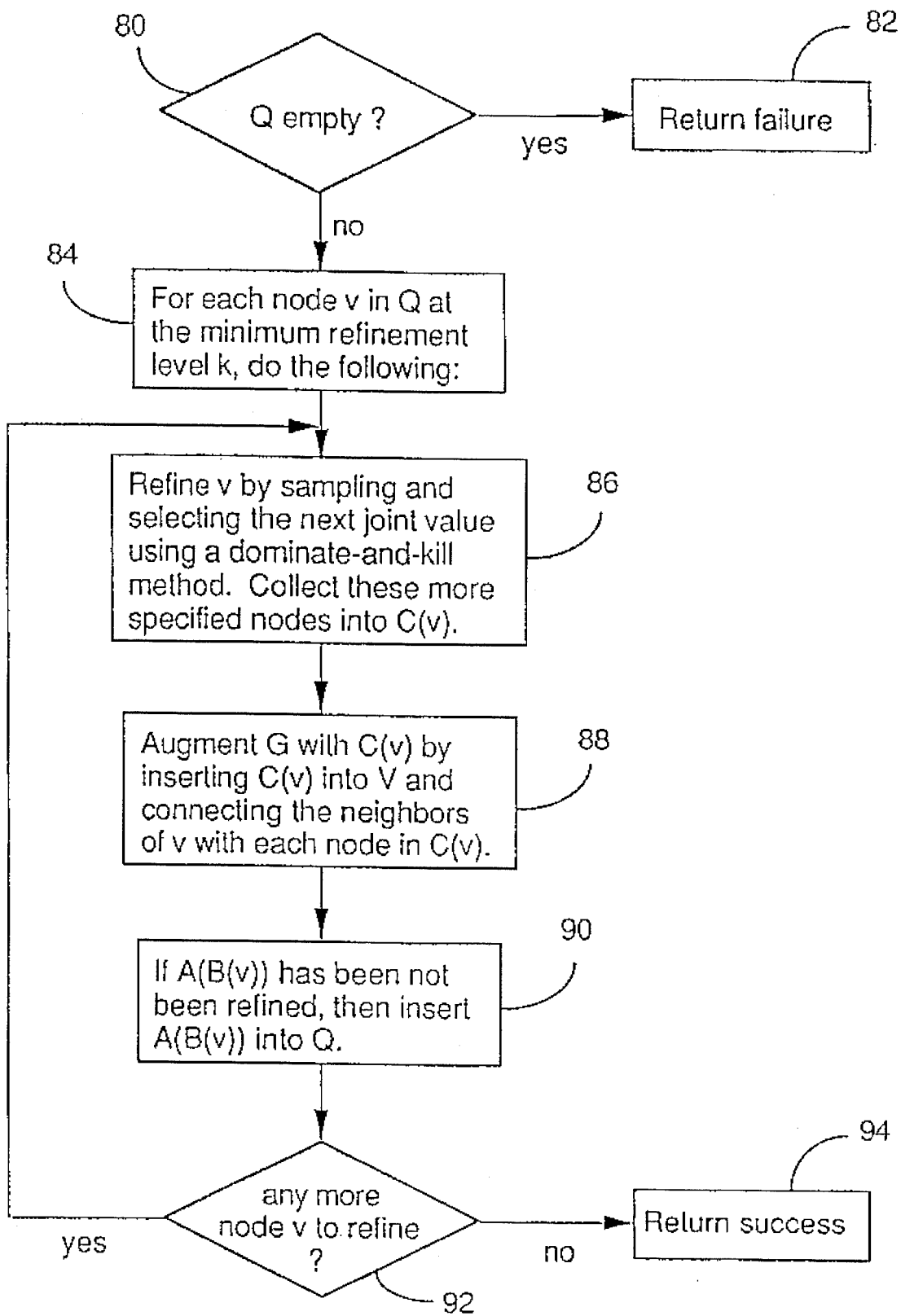
FIG. 4 is a flowchart illustrating the preferred node refinement stage of the method of the invention.

In the sequence-generation stage of the global planner, see FIG. 2, if Dijkstra's method produces no plausible candidate sequence of subgoals 38, then the node-refinement stage is entered, illustrated in FIG. 4. In this stage, G is modified by refining certain subgoals in Q until either a candidate sequence becomes available or Q becomes empty 80 (in which case no collision-free path exists within the specified tolerances of the planning system 82). The node-refinement stage extracts the nodes of Q at the minimum refinement level k and refines each such node v as follows: First, the first k components of v are retained. Next, using only the links which positions are totally specifiable by the first k+1 Joints, the distance between the links and other objects in the robot's workspace are computed for all possible $(k+1)^{th}$ joint values. The resulting set of nodes at refinement level k+1 is filtered into C(v) using a dominate-and-kill method 86. In this method, the process of selecting a node v' with the maximum distance value and removing each node whose $(k+1)^{th}$ component is within, for example, half of $T_e$ to that of v' is repeated until every node is considered. C(v) is then inserted into V and every node previously connected to v is now connected with every node of C(v) 88. Finally, if A(B(v)) has not been already refined, then A(B(v)) is placed into Q 90 to ensure that every node of U is refined, if necessary. When refinement is complete for all nodes extracted from Q 92, the sequence-generation stage is then reentered 94.

Figure 5:
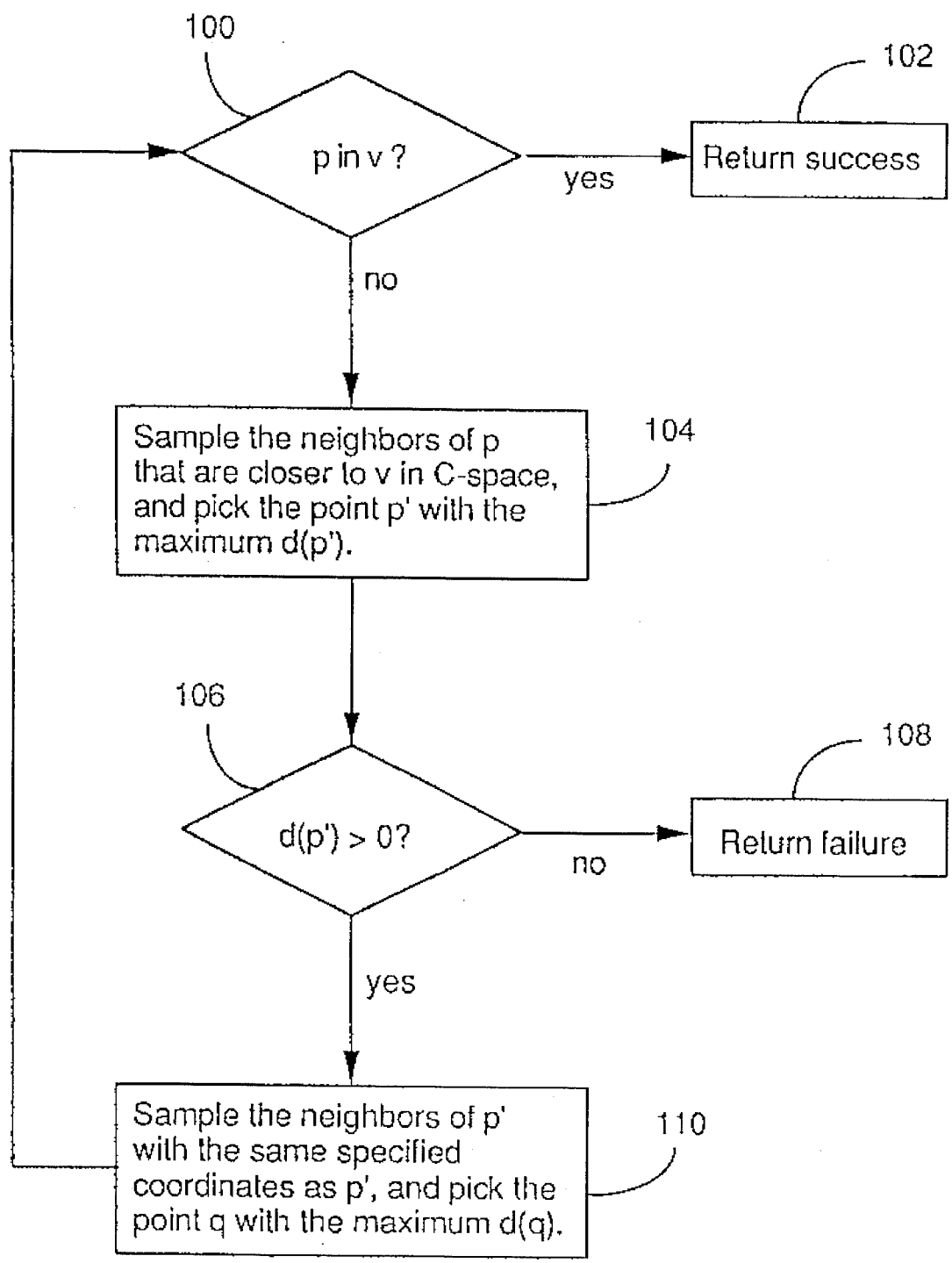
FIG. 5 is a flowchart illustrating the preferred local planning of the method of the invention.

The preferred local planner, illustrated in FIG. 5, plots movement of the robot manipulator in configuration space step by step. The stride of each joint has been preset (or predetermined) and normalized so that the maximum distance traveled by any point on the manipulator is about the same for each stride. Collision checking is done after the manipulator takes a simulated step. It is possible for the manipulator to collide with objects while taking a step, even though it does not collide with any object before or after the step. The invention assumes that, given small enough strides, such collisions are very minor and can be ignored.

The local planner checks the reachability of a node v from a point p by moving the robot manipulator from p to a point q in the subspace of v as follows: First, the local planner samples randomly a number, such as $\Delta^2$, of points within one step of p that are closer to v and chooses the point p' with the greatest d(p') 104. If each p' is a collision point 106, the local planner reports failure 108. Next, the local planner samples another number, such as $\Delta^2$, of points within one step of p' within the dimensions unspecified by v, and chooses the point q with the greatest d(q) 110. The local planner repeats the above steps until a non-collision point q is reached within the subspace of v 100, in which case it returns that point to the verification stage of the global planner 102.

Figure 6:
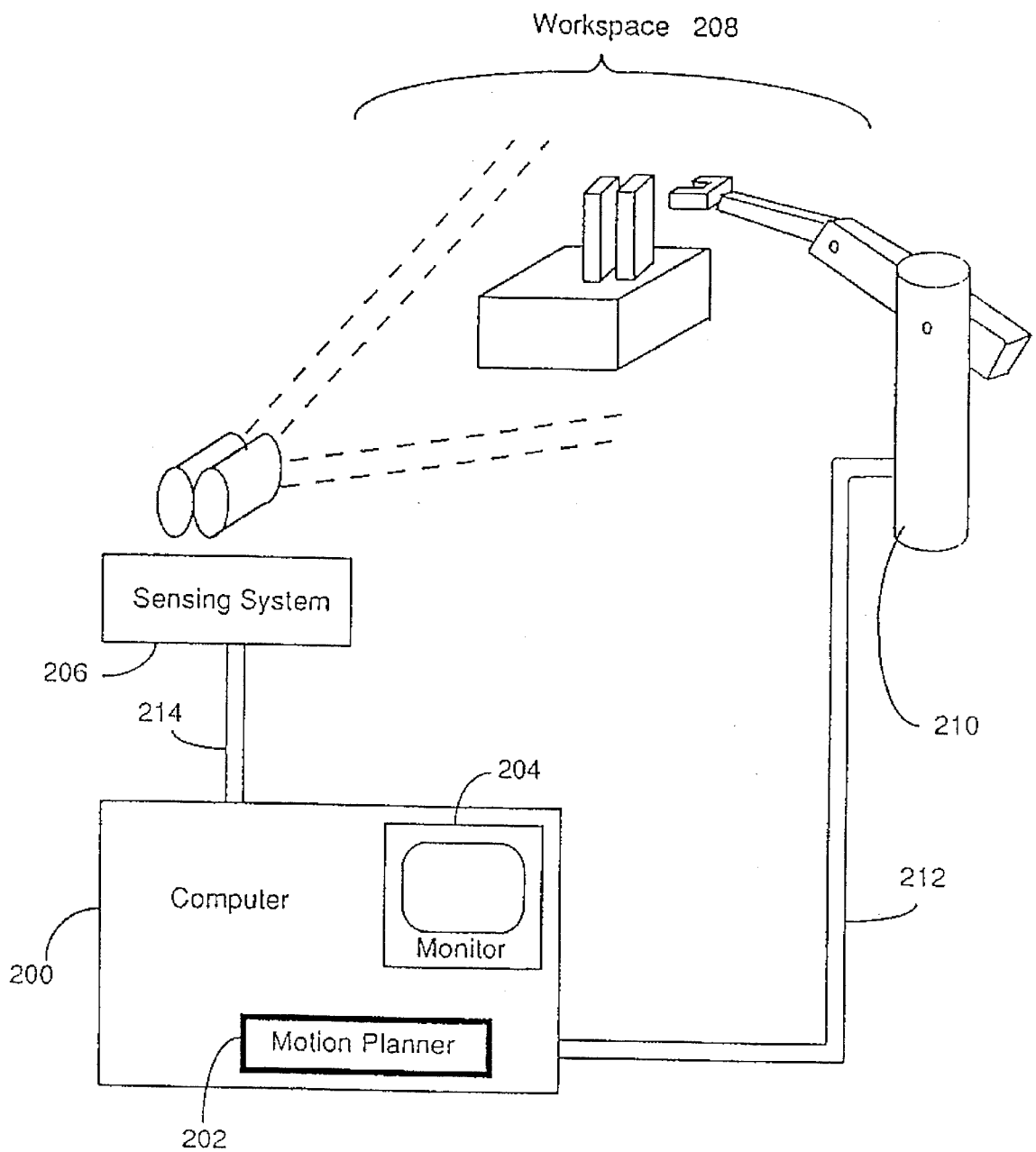
FIG. 6 illustrates the preferred embodiment of the apparatus of the invention.

The preferred apparatus of the present invention is illustrated in FIG. 6. Computer 200, comprising software or firmware 202 embodying the invention, is linked to sensing system 206 by data path 214 and to robot manipulator 210 by data path 212. Sensing system 206 provides to computer 200 data on the current location of objects within workspace 208 of robot manipulator 210. Computer 200 causes robot manipulator 210 to move by issuing commands to it over data path Computer 200 may additionally comprise monitor 204 to display a simulation of the environment and motions of robot manipulator 210. More than one robot manipulator may be within the workspace, each controlled by one or more computers. Additionally, a single computer may control robot manipulators within distinct workspaces, each workspace having its own sensing system connected to the single computer.

The method and apparatus of the present invention is useful in robotic systems to rapidly and automatically plan a movement for a robot manipulator that does not collide with objects in the environment of the manipulator. Once a motion has been planned by the invention, the motion may then be executed by the manipulator either once or repeatedly. Changes in the environment may be compensated for by repeating the motion planning process given the new state of the environment.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A method for moving a robot manipulator comprising a plurality of joints through a workspace containing obstacles from a preselected starting robot manipulator configuration to a preselected goal robot manipulator configuration, the method comprising the steps of:

a) selecting as subgoals robot manipulator configurations for which attitudinal positions are unspecified for one or more joints;

b) generating a sequence of the subgoals that connect the starting robot manipulator configuration to the goal robot manipulator configuration;

c) verifying that the generated sequence of subgoals is collision-free; and d) moving the robot manipulator from the starting robot manipulator configuration to the goal robot manipulator configuration such that a path of configurations defined by the generated sequence of subgoals is followed by the robot manipulator.

2. The invention of claim 1 wherein the step of selecting subgoals comprises selecting from a set of subgoals within a subspace of an existing subgoal, each member of the set having a refinement level one greater than the existing subgoal.

3. The invention of claim 2 wherein the step of selecting from the set of subgoals comprises selecting those subgoals having greatest distances from objects in the workspace and being greater than a specified edge cost away from other selected subgoals.

4. The invention of claim 1 wherein the step of generating a sequence of the subgoals that connect the starting robot manipulator configuration to the goal robot manipulator configuration comprises applying a shortest path method to the selected subgoals having no verified collision-free sequence of robot manipulator configurations from either the starting robot manipulator configuration or the goal robot manipulator configuration.

5. The invention of claim 4 wherein the step of applying a shortest path method comprises the steps of:

a) defining potential first points of the shortest path as a set of all robot manipulator configurations having a verified collision-free path of robot manipulator configurations from the starting robot manipulator configuration; and b) defining potential end points of the shortest path as a set of all robot manipulator configurations having a verified collision-free sequence of robot manipulator configurations from the goal robot manipulator configuration.

6. The invention of claim 4 wherein the step of applying a shortest path method comprises the steps of:

a) defining potential first points of the shortest path as a set of all robot manipulator configurations having a verified collision-free path of robot manipulator configurations from the goal robot manipulator configuration; and b) defining potential end points of the shortest path as a set of all robot manipulator configurations having a verified collision-free sequence of robot manipulator configurations from the starting robot manipulator configuration.

7. The invention of claim 4 wherein the step of applying a shortest path method comprises defining an edge cost between two subgoal robot manipulator configurations as a sum of differences between commonly specified components of configuration space nodes representing the two subgoal robot manipulator configurations.

8. The invention of claim 1 wherein the step of verifying that the generated sequence of subgoals is collision-free comprises searching for a collision-free sequence of robot manipulator configurations for each pair of subgoals adjacent in the generated sequence.

9. The invention of claim 8 wherein the step of searching for a collision-free sequence of robot manipulator configurations comprises searching bi-directionally.

10. The invention of claim 9 wherein the step of searching bi-directionally comprises determining a direction of search by which of two robot manipulator configurations, having a verified collision-free sequence of robot manipulator configurations from the starting robot manipulator configuration and the goal robot manipulator configuration, respectively, has a smaller Euclidean distance from a corresponding nearest obstacle in the workspace.

11. The invention of claim 1 wherein the step of verifying that the generated sequence of subgoals is collision-free comprises choosing a robot manipulator configuration from a sampling of a preselected number of robot manipulator configurations within a single step of a robot manipulator configuration having a verified collision-free sequence of robot manipulator configurations from either the starting robot manipulator configuration or the goal robot manipulator configuration.

12. The invention of claim 11 wherein the step of choosing a robot manipulator configuration from a sampling comprises choosing a robot manipulator configuration of the sampling having a greatest Euclidean distance from a corresponding nearest obstacle in the workspace.

13. The invention of claim 1 wherein the method comprises employing a dynamic graph data structure.

14. The invention of claim 13 wherein the method comprises employing vertices of the dynamic graph comprising subgoal robot manipulator configurations having a verified collision-free sequence of robot manipulator configurations from either the starting robot manipulator configuration or the goal robot manipulator configuration.

15. The invention of claim 13 wherein the method comprises employing vertices of the dynamic graph comprising subgoal robot manipulator configurations having no verified collision-free sequence of robot manipulator configurations from either the starting robot manipulator configuration or the goal robot manipulator configuration.

16. The invention of claim 13 wherein the method comprises employing vertices of the dynamic graph comprising robot manipulator configurations having a verified collision-free sequence of robot manipulator configurations from either the starting robot manipulator configuration or the goal robot manipulator configuration.

17. The invention of claim 13 wherein the method comprises employing edges of the dynamic graph comprising connections between subgoal robot manipulator configurations having a verified collision-free sequence of robot manipulator configurations from either the starting robot manipulator configuration or the goal robot manipulator configuration and subgoal robot manipulator configurations having no verified collision-free sequence of robot manipulator configurations from either the starting robot manipulator configuration or the goal robot manipulator configuration.

18. The invention of claim 13 wherein the method comprises employing edges of the dynamic graph comprising connections between subgoal robot manipulator configurations having no verified collision-free sequence of robot manipulator configurations from either the starting robot manipulator configuration or the goal robot manipulator configuration and robot manipulator configurations having a verified collision-free sequence of robot manipulator configurations from either the starting robot manipulator configuration or the goal robot manipulator configuration.

19. The invention of claim 1 wherein the method comprises mapping possible robot manipulator configurations into a configuration space having a number of dimensions equal to a number of degrees of freedom of the robot manipulator.

20. The invention of claim 19 wherein the step of mapping possible robot manipulator configurations comprises defining an extent of each dimension dependent on a preselected stride value for a corresponding joint of the robot manipulator.

21. The invention of claim 20 further comprising the step of normalizing the preselected stride value such that each point on the robot manipulator moves approximately a same Euclidean distance for each step in a corresponding dimension.

22. An apparatus for moving a robot manipulator comprising a plurality of joints through a workspace containing obstacles from a preselected starting robot manipulator configuration to a preselected goal robot manipulator configuration, said apparatus comprising:

means for selecting as subgoals robot manipulator configurations for which attitudinal positions are unspecified for one or more joints;

means for generating a sequence of said subgoals that connect said starting robot manipulator configuration to said goal robot manipulator configuration;

means for verifying that said generated sequence of subgoals is collision-free; and means for moving said robot manipulator from said starting robot manipulator configuration to said goal robot manipulator configuration such that a path of configurations defined by said generated sequence of subgoals is followed by said robot manipulator.

23. The invention of claim 22 wherein said means for selecting subgoals comprises means for selecting from a set of subgoals within a subspace of an existing subgoal, each member of said set having a refinement level one greater than said existing subgoal.

24. The invention of claim 23 wherein said means for selecting from said set of subgoals comprises means for selecting those subgoals having greatest distances from objects in said workspace and being greater than a specified edge cost away from other selected subgoals.

25. The invention of claim 22 wherein said means for generating a sequence of said subgoals that connect said starting robot manipulator configuration to said goal robot manipulator configuration comprises means for applying a shortest path method to said selected subgoals having no verified collision-free sequence of robot manipulator configurations from either said starting robot manipulator configuration or said goal robot manipulator configuration.

26. The invention of claim 25 wherein said means for applying a shortest path method comprises:

means for defining potential first points of said shortest path as a set of all robot manipulator configurations having a verified collision-free path of robot manipulator configurations from said starting robot manipulator configuration; and means for defining potential end points of said shortest path as a set of all robot manipulator configurations having a verified collision-free sequence of robot manipulator configurations from said goal robot manipulator configuration.

27. The invention of claim 25 wherein said means for applying a shortest path method comprises:

means for defining potential first points of said shortest path as a set of all robot manipulator configurations having a verified collision-free path of robot manipulator configurations from said goal robot manipulator configuration; and means for defining potential end points of said shortest path as a set of all robot manipulator configurations having a verified collision-free sequence of robot manipulator configurations from said starting robot manipulator configuration.

28. The invention of claim 25 wherein said means for applying a shortest path method comprises means for defining an edge cost between two subgoal robot manipulator configurations as a sum of differences between commonly specified components of configuration space nodes representing said two subgoal robot manipulator configurations.

29. The invention of claim 22 wherein said means for verifying that said generated sequence of subgoals is collision-free comprises means for searching for a collision-free sequence of robot manipulator configurations for each pair of subgoals adjacent in said generated sequence.

30. The invention of claim 29 wherein said means for searching for a collision-free sequence of robot manipulator configurations comprises means for searching bi-directionally.

31. The invention of claim 30 wherein said means for searching bi-directionally comprises means for determining a direction of search by which of two robot manipulator configurations, having a verified collision-free sequence of robot manipulator configurations from said starting robot manipulator configuration and said goal robot manipulator configuration, respectively, has a smaller Euclidean distance from a corresponding nearest obstacle in said workspace.

32. The invention of claim 22 wherein said means for verifying that said generated sequence of subgoals is collision-free comprises means for choosing a robot manipulator configuration from a sampling of a preselected number of robot manipulator configurations within a single step of a robot manipulator configuration having a verified collision-free sequence of robot manipulator configurations from either said starting robot manipulator configuration or said goal robot manipulator configuration.

33. The invention of claim 32 wherein said means for choosing a robot manipulator configuration from a sampling comprises means for choosing a robot manipulator configuration of said sampling having a greatest Euclidean distance from a corresponding nearest obstacle in said workspace.

34. The invention of claim 22 wherein said apparatus comprises means for employing a dynamic graph data structure.

35. The invention of claim 34 wherein said apparatus comprises means for employing vertices of said dynamic graph comprising subgoal robot manipulator configurations having a verified collision-free sequence of robot manipulator configurations from either said starting robot manipulator configuration or said goal robot manipulator configuration.

36. The invention of claim 34 wherein said apparatus comprises means for employing vertices of said dynamic graph comprising subgoal robot manipulator configurations having no verified collision-free sequence of robot manipulator configurations from either said starting robot manipulator configuration or said goal robot manipulator configuration.

37. The invention of claim 34 wherein said apparatus comprises means for employing vertices of said dynamic graph comprising robot manipulator configurations having a verified collision-free sequence of robot manipulator configurations from either said starting robot manipulator configuration or said goal robot manipulator configuration.

38. The invention of claim 34 wherein said apparatus comprises means for employing edges of said dynamic graph comprising connections between subgoal robot manipulator configurations having a verified collision-free sequence of robot manipulator configurations from either said starting robot manipulator configuration or said goal robot manipulator configuration and subgoal robot manipulator configurations having no verified collision-free sequence of robot manipulator configurations from either said starting robot manipulator configuration or said goal robot manipulator configuration.

39. The invention of claim 34 wherein said apparatus comprises means for employing edges of said dynamic graph comprising connections between subgoal robot manipulator configurations having no verified collision-free sequence of robot manipulator configurations from either said starting robot manipulator configuration or said goal robot manipulator configuration and robot manipulator configurations having a verified collision-free sequence of robot manipulator configurations from either said starting robot manipulator configuration or said goal robot manipulator configuration.

40. The invention of claim 22 wherein said apparatus comprises means for mapping possible robot manipulator configurations into a configuration space having a number of dimensions equal to a number of degrees of freedom of said robot manipulator.

41. The invention of claim 40 wherein said means for mapping possible robot manipulator configurations comprises means for defining an extent of each dimension dependent on a preselected stride value for a corresponding joint of said robot manipulator.

42. The invention of claim 41 further comprising means for normalizing said preselected stride value such that each point on said robot manipulator moves approximately a same Euclidean distance for each step in a corresponding dimension.

43. The invention of claim 22 further comprising means for sensing locations of objects within said workspace.

44. The invention of claim 22 further comprising a computer.

45. The invention of claim 22 further comprising means for display of a simulation of said workspace and said robot manipulator.

* * * * *